United States Patent
Veluru et al.

(10) Patent No.: US 12,531,412 B2
(45) Date of Patent: Jan. 20, 2026

(54) SMART POWER SPLITTERS FOR HIGH VOLTAGE OUTLET

(71) Applicant: NeoCharge Incorporated, San Luis Obispo, CA (US)

(72) Inventors: Akhil Veluru, Plymouth, MN (US); Spencer Andrew Harrison, San Luis Obispo, CA (US); Ryan Meffert, Arroyo Grande, CA (US)

(73) Assignee: NeoCharge Incorporated, San Luis Obispo, CA (US)

( * ) Notice: Subject to any disclaimer, the term of this patent is extended or adjusted under 35 U.S.C. 154(b) by 220 days.

(21) Appl. No.: 18/542,223

(22) Filed: Dec. 15, 2023

(65) Prior Publication Data

US 2024/0120737 A1     Apr. 11, 2024

Related U.S. Application Data

(63) Continuation of application No. 17/199,368, filed on Mar. 11, 2021, now Pat. No. 11,916,381.

(Continued)

(51) Int. Cl.
*H02J 3/00*     (2006.01)
*H02B 1/26*     (2006.01)
(Continued)

(52) U.S. Cl.
CPC ............ *H02J 3/0012* (2020.01); *H02B 1/26* (2013.01); *H02H 7/00* (2013.01); *H02J 13/00002* (2020.01); *H02J 13/00036* (2020.01)

(58) Field of Classification Search
None
See application file for complete search history.

(56) References Cited

U.S. PATENT DOCUMENTS

| 5,825,850 A | 10/1998 | Bren et al. |
| 8,749,304 B2 * | 6/2014 | Kaehs ........................ H03F 1/52 |
| | | 330/297 |

(Continued)

FOREIGN PATENT DOCUMENTS

WO     2021183828 A1     9/2021

OTHER PUBLICATIONS

International Preliminary Report on Patentability for International Application PCT/US2021/022005, Report issued Sep. 6, 2022, Mailed on Sep. 22, 2022, 9 Pgs.

(Continued)

*Primary Examiner* — Courtney L Smith
(74) *Attorney, Agent, or Firm* — KPPB LLP

(57) ABSTRACT

Systems and methods for managing power distribution from in-home electrical wiring are disclosed. In one embodiment, a power splitter device includes a an electrical input source connection with a first input line and a second input line for two hot phases of alternating current electricity, a primary electrical output and a secondary electrical output, the primary electrical output having a first primary output line and a second primary output line and the secondary electrical output having a first secondary output line and a second secondary output line, a first, second, third, and fourth current sensor, a first relay and a second relay, and a control logic microprocessor configured to receive measurements of current, determine an overcurrent condition based upon measurements of current over a period of time and disconnect power from the secondary electrical output connection based upon a determined overcurrent condition.

20 Claims, 11 Drawing Sheets

Related U.S. Application Data

(60) Provisional application No. 62/988,022, filed on Mar. 11, 2020.

(51) Int. Cl.
  *H02H 7/00* (2006.01)
  *H02J 13/00* (2006.01)

(56) References Cited

U.S. PATENT DOCUMENTS

| | | | |
|---|---|---|---|
| 9,281,715 B2* | 3/2016 | Lim | H02J 9/04 |
| 9,937,812 B1 | 4/2018 | Billmaier | |
| 9,966,206 B1 | 5/2018 | Sastry et al. | |
| 11,302,491 B2* | 4/2022 | Henke | H01H 1/38 |
| 11,726,515 B2* | 8/2023 | Galin | H02J 3/14 |
| | | | 307/113 |
| 11,831,143 B1* | 11/2023 | Krause | H02H 3/04 |
| 11,916,381 B2 | 2/2024 | Veluru et al. | |
| 2011/0202418 A1 | 8/2011 | Kempton et al. | |
| 2011/0221393 A1 | 9/2011 | Billmaier | |
| 2012/0013298 A1 | 1/2012 | Prosser et al. | |
| 2012/0032636 A1 | 2/2012 | Bianco | |
| 2012/0223675 A1* | 9/2012 | Bianco | H02J 3/14 |
| | | | 320/109 |
| 2012/0313434 A1 | 12/2012 | Billmaier | |
| 2012/0319649 A1 | 12/2012 | Billmaier | |
| 2013/0179061 A1 | 7/2013 | Gadh et al. | |
| 2014/0042809 A1 | 2/2014 | Lim et al. | |
| 2014/0347791 A1 | 11/2014 | Mazurek | |
| 2015/0000046 A1 | 1/2015 | Hull | |
| 2016/0075246 A1 | 3/2016 | Liptak | |
| 2017/0150580 A1 | 5/2017 | Mix et al. | |
| 2017/0234698 A1 | 8/2017 | Knuth et al. | |
| 2017/0361728 A1 | 12/2017 | Bianco et al. | |
| 2018/0043786 A1 | 2/2018 | Corbeil et al. | |
| 2018/0212426 A1* | 7/2018 | Har-Shai | H02J 3/46 |
| 2018/0215276 A1 | 8/2018 | Lowenthal et al. | |
| 2018/0252750 A1* | 9/2018 | Danesh | H02H 3/006 |
| 2019/0019259 A1 | 1/2019 | Bazhinov | |
| 2021/0288494 A1 | 9/2021 | Veluru et al. | |

OTHER PUBLICATIONS

International Search Report and Written Opinion for International Application No. PCT/US2021/022005, Search completed May 19, 2021, Mailed Jun. 7, 2021, 20 pgs.

"Dryer Buddy Plus AUTO with kWh meter Demo for Level 2 EV charging stations—240v outlet splitter", YouTube, BSA Electronics, Oct. 25, 2017, retrieved from https://www.youtube.com/watch?v=tWbsAitle4l on Dec. 15, 2023, 3 pgs.

"EV-Powershare, smart & safe way to share L2 charging access A device to easily, safely and cost effectively share high voltage (240V) circuit to charge Electric Vehicles", iCrowdNewswire, Feb. 18, 2020, Retrieved: https://icrowdnewswire.com/2020/02/18/ev-powershare-smart-safe-way-to-share-12-charging-access-a-device-to-easily-safely-and-cost-effectively-share-high-voltage-240v-circuit-to-charge-electric-vehicles/,.

"New device to get EV charging capability in apartment and condo buildings", Utility Dive, B&B Technology, Inc., Dec. 26, 2020, retrieved from https://www.utilitydive.com/press-release/20201226-new-device-to-get-ev-charging-capability-in-apartment-and-condo-buildings-1/ on Dec. 15, 2023, 2 pgs.

"Splitvolt Launches to Address Electric Vehicle Fast Home Charging Challenges", Business Wire, Nov. 17, 2020, Retrieved from: https://www.tmcnet.com/usubmit/-splitvolt-launches-address-electric-vehicle-fast-home-charging-/2020/11/17/9258898.htm, 2 pgs.

Morris, "simpleSwitch makes it easy to install a Level 2 charger without upgrading your power panel", Charged EV Fleet & Infrastructure News, Oct. 17, 2021, retrieved from https://chargedevs.com/newswire/simpleswitch-makes-it-easy-to-install-a-level-2-charger-without-upgrading-your-power-panel/ on Dec. 15, 2023, 18 pgs.

* cited by examiner

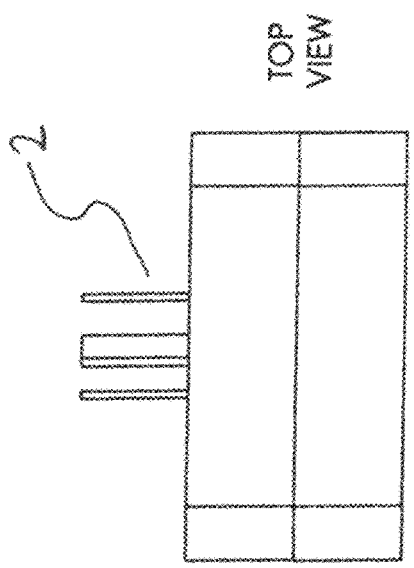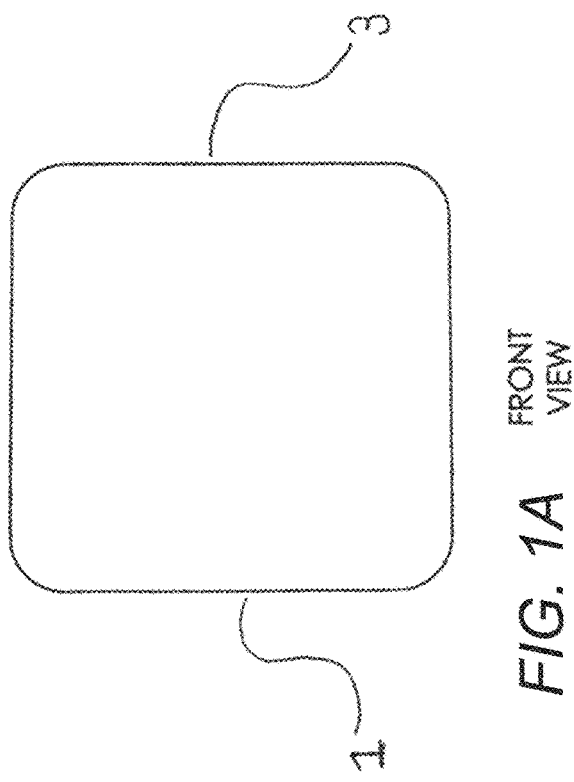
FIG. 1B TOP VIEW
FIG. 1A FRONT VIEW

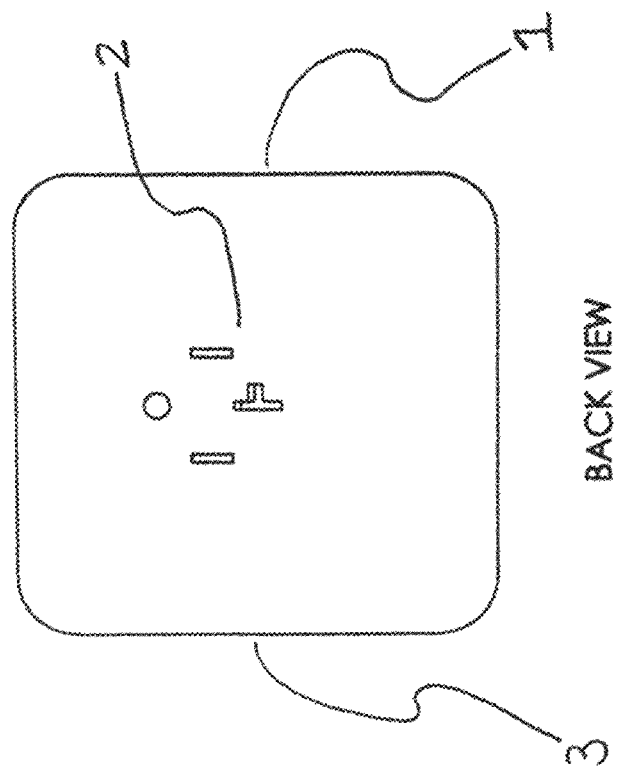
FIG. 1D BACK VIEW
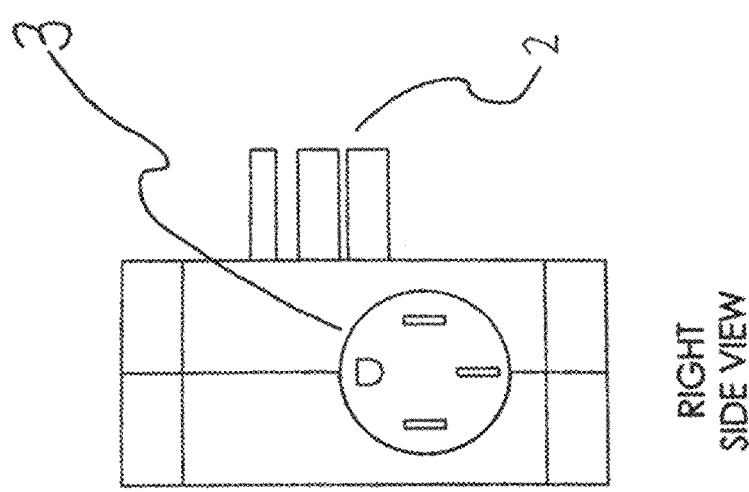
FIG. 1C RIGHT SIDE VIEW

SMART POWER SPLITTERS FOR HIGH VOLTAGE OUTLET

CROSS-REFERENCE TO RELATED APPLICATION

The current application is a continuation to U.S. patent application Ser. No. 17/199,368, entitled "Smart Power Splitters for High Voltage Outlet", filed Mar. 11, 2021, which claims priority under 35 U.S.C. 119(e) to U.S. Provisional Patent Application Ser. No. 62/988,022, entitled "Smart Power Splitters for High Voltage Outlet", filed Mar. 11, 2020. The disclosures of U.S. patent application Ser. No. 17/199,368 and U.S. Provisional Patent Application Ser. No. 62/988,022 are hereby incorporated by reference in their entirety for all purposes.

FIELD OF THE INVENTION

The field of the invention relates generally to power adapters, and more specifically to power splitters for household wall outlets.

BACKGROUND

The following description includes information that may be useful in understanding the present invention. It is not an admission that any of the information provided herein is prior art or relevant to the presently claimed invention, or that any publication specifically or implicitly referenced is prior art.

The personal use of electric vehicles (EVs) in North America has grown substantially in the past decade from early adopters to mainstream consumers. The market for EVs continues to expand as the cost of the vehicles are reduced to near parity with ICE (internal combustion engine) gasoline vehicles. One significant detractor from mainstream consumer adoption is the current cost and complexity of charging support in the home. While many early EVs may charge on 110V, it is painfully slow (upwards of 12-16 hours) and is not acceptable for EVs that have larger batteries and longer driving range on a charge. Early EVs had very limited ranges per charge, averaging between 20-40 miles, and could marginally accept overnight charging on 110V sources. However, with the availability of lower prices of EVs, the latest electric vehicles also employ much larger batteries yielding increased driving ranges of up to 400 miles on a single charge. These newer EVs require an increased and improved charging capability often referred to as "Level II" charging. Level II charging requires the use of a higher voltage source such as 240 Volts (typically 196-264V) with which recharging of an EV battery system can be accomplished in as little as 2 hours. Additionally, 110V power sources are generally incompatible with Level II charging.

Typical North American homes have a single existing 240V outlet, which is often already dedicated to an electric dryer or electric water heater. While early EV adopters and wealthy purchasers of expensive (i.e. ~$75-100K MSRP) electric vehicles generally are not hindered from paying an electrician to install a dedicated 240V outlet for charging in the home, general mainstream consumers are greatly hindered buying EVs (as low as $20K MSRP) because of the significant charging support cost (upwards of $1500) and delay (up to weeks) for employing a Level II charging requirement using a dedicated 240V outlet. Additionally, potential EV customers that do not own a home but rather rent a home (due to their inability to purchase a home, or that their mobile lifestyle precludes owning a home) are without a Level II charging solution altogether since a renter is unwilling to invest a significant amount (e.g. $1500) in a home modification they cannot take with them when they move. Additionally, landlords are often unwilling to allow their rented properties (homes) to be modified or altered. Furthermore, not only is there often a lack of spare outlets in a household, many homes, particularly older homes, have a lack of capacity in the existing electrical panel (often 100 Amp) Simply adding additional appliances, EV chargers, and/or other electrical devices can increase the load beyond the rated capacity and trip breakers in the electrical panel, necessitating a resident to physically access the panel to reset the breakers.

BRIEF DESCRIPTION OF THE DRAWINGS

FIG. 1A illustrates a front view of a smart power splitter in accordance with certain embodiments of the invention.

FIG. 1B illustrates a top view of a smart power splitter in accordance with certain embodiments of the invention.

FIG. 1C illustrates a right side view of a smart power splitter in accordance with certain embodiments of the invention.

FIG. 1D illustrates a back view of a smart power splitter in accordance with certain embodiments of the invention.

DETAILED DESCRIPTION OF THE INVENTION

Apparatus, systems and methods for providing a smart power splitter (accessory) for high voltage outlets (e.g., 220 or 240 volts) that can intelligently divert and/or enable power-sharing between multiple devices connected to the splitter are disclosed. Such devices can include, but are not limited to, electric stoves, electric dryers, electric water heaters, electric heat pumps, welders, saunas, hot tubs, air conditioners, ovens, and electric vehicles (EVs) and EV chargers. EV chargers can be referred to as electric vehicle supply equipment (EVSE). EVSE, in particular, often have smart functionality that assumes a constant power supply and can be sensitive to have their power shut off abruptly. Therefore, certain embodiments of the invention include control logic (that may include, e.g., a microprocessor) that can monitor each output connection for the current draw from the attached devices at a rate that is fast enough to detect overload states and disable one or more of the outputs based at least upon the current draw over time. For example, it may utilize a "soft breaker" to simulate a physical circuit breaker that can allow some amount of peaking in the current draw and utilize different timers based upon how much higher the current is above a specified range. At higher current, it may impose a shorter time window before shutoff. A "soft breaker" can be implemented using current sensors, relays, and a microprocessor as will be discussed further below.

Many embodiments of the invention can solve the high cost and inherent installation delay (and thereby delay of practical electric vehicle use) by enabling Level II EV charging and electric appliance support in typical homes. In the case of potential EV purchasers that are renters, the invention provides a new and unique opportunity that they would otherwise would have no access to Level II charging and thereby lose out on the choice of adopting personal EV transportation.

In several embodiments, the smart power splitter can be used to split and/or share power between an appliance and an EV charger through the use of an existing 220- or 240-volt outlet. This effectively allows the outlet to be used by two devices (loads) without having to remove the existing appliance (often an electric dryer, electric heat pump, electric stove, refrigerator, air conditioner, or electric water heater) or having to repeatedly plug and unplug cords between uses of existing (primary) appliance and EV charger. All of this can be done while maintaining the existing home electrical circuit standard rating and capability in accordance with many embodiments of the invention.

Figure 1E:
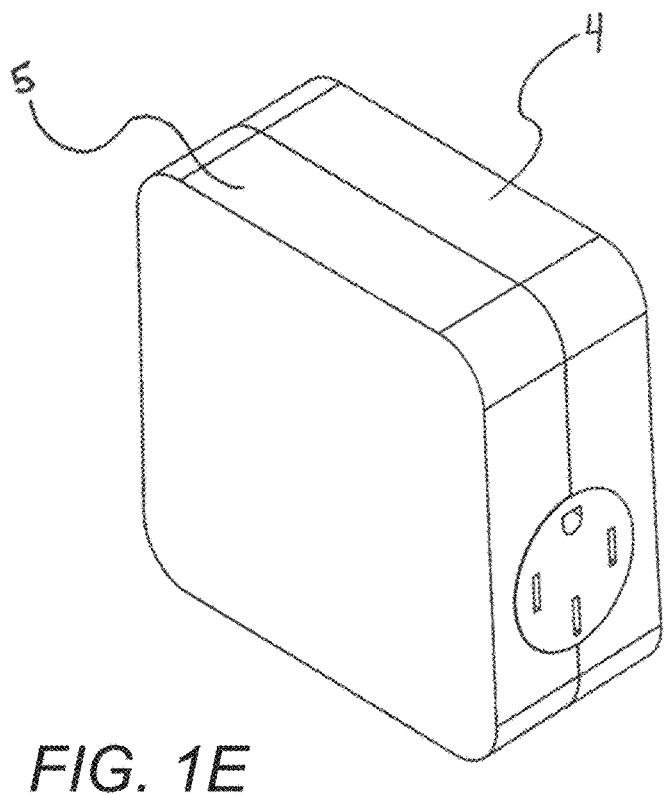
FIG. 1E illustrates a perspective view of a smart power splitter in accordance with certain embodiments of the invention.
Figure 1F:
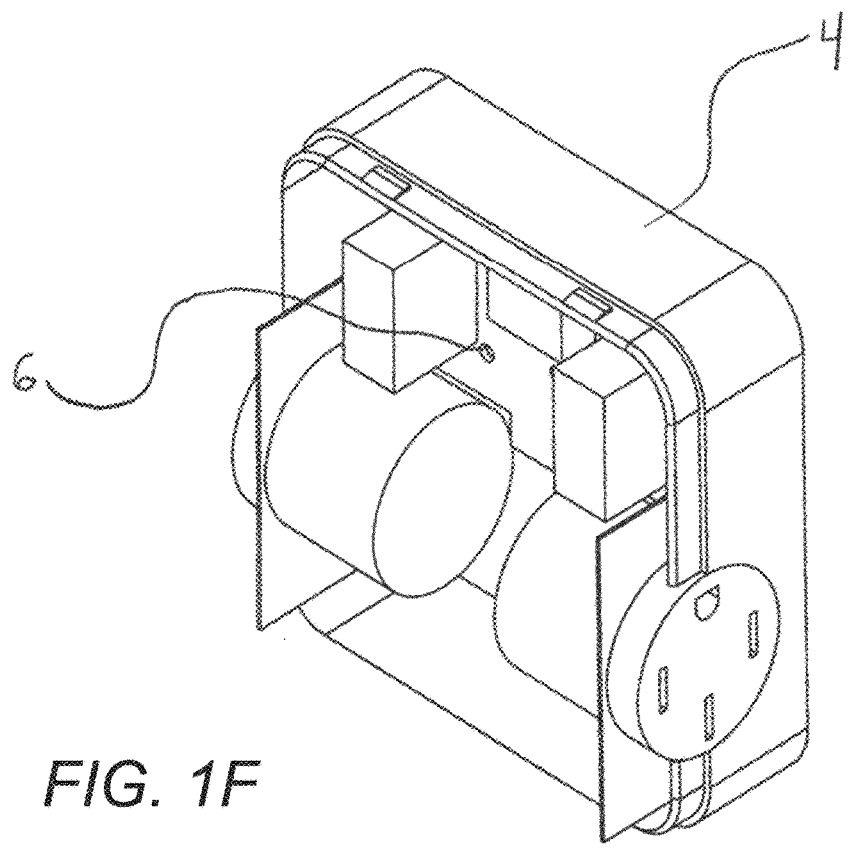
FIG. 1F illustrates an interior view of a smart power splitter in accordance with certain embodiments of the invention.

While the outer enclosure of a power splitter may take on any of a variety of appearances, a visual depiction can be helpful to show how connections may be oriented on the power splitter. FIGS. 1A-1E illustrate the exterior of a power splitter in accordance with some embodiments of the invention. FIG. 1F illustrates the interior of a power splitter in accordance with some embodiments. As can be seen in the figures, the power splitter can be configured to plug directly into an existing outlet (e.g., 240V wall outlet) via plug 2 and provide two high-voltage powered connections (first outlet 1 and second outlet 3) which may be physically oriented orthogonal to the existing outlet (e.g., the connections are mounted on the sides of the enclosure that are perpendicular to the mounting wall). Thus, in some embodiments, the power splitter can permit the primary appliance (connected to first outlet 1) to always be connected to the power source, while the secondary device (e.g. Level II charger, connected to second outlet 3) can be limited to only receive power when total combined current draw of the outlets is less than the allowable capacity of the input plug 2 (typically 1-5 amps). In several embodiments of the invention, the power splitter can utilize a "soft breaker" capability (providing overcurrent protection) instead of a constant threshold as will be discussed further below. This allows the existing appliance at outlet 1 (e.g., an electric dryer) to continue to operate as before, while permitting power to an EV vehicle or other device when the existing appliance is not in use. Using the power splitter, the need to hire an electrician or other professional to install another 240V or other high voltage outlet can be eliminated.

It is contemplated that the dimension of the power splitter from where the prongs enter the enclosure to the front (opposite side) of the enclosure may be less than 6 inches in certain embodiments, which allows for "nesting" of the accessory within the exhaust duct area from the dryer. This is advantageous as it allows use of the accessory without disruption or relocation of existing appliance. In additional embodiments of the invention, instead of a wall outlet plug 2, the power splitter can be directly hardwired into an existing circuit in an electrical panel. This can provide greater flexibility in installations where an outlet is not available.

The smart power splitter may utilize intelligent power switching ("smart switching") by use of current sensors to measure when current is being drawn/used by the primary appliance/load. Contemplated sensors can include, but are not limited to, hall effect sensor, shunt resistor, current transformer and so forth. As will be discussed further below, this information can be analyzed via an algorithm(s) and microprocessor(s) to switch power on and off to the secondary load connection using the relays. The switching techniques are able to divert power between the connections/loads without any input from the consumer (user) or any outside source. The relays for switching can be mounted to a PCB for structural integrity and ease of assembly. In some embodiments, the PCB can include a processor, one or more sensors for sensing current flow to or through one or both of the first and second outlets, and one or more switches to control current flow to at least one of the outlets. By using a PCB which integrates sensing, switching, and control, the splitter advantageously increases its reliability and reduces its complexity thus easing assembly of the splitter. Further details of components and layout of a smart power splitter in accordance with embodiments of the invention are discussed below.

Smart Power Splitter Layout

Several embodiments include a smart power splitter where the primary output remains enabled (non-switchable) and the secondary output is switchable (enabled and disabled, e.g., via relays).

Figure 2:
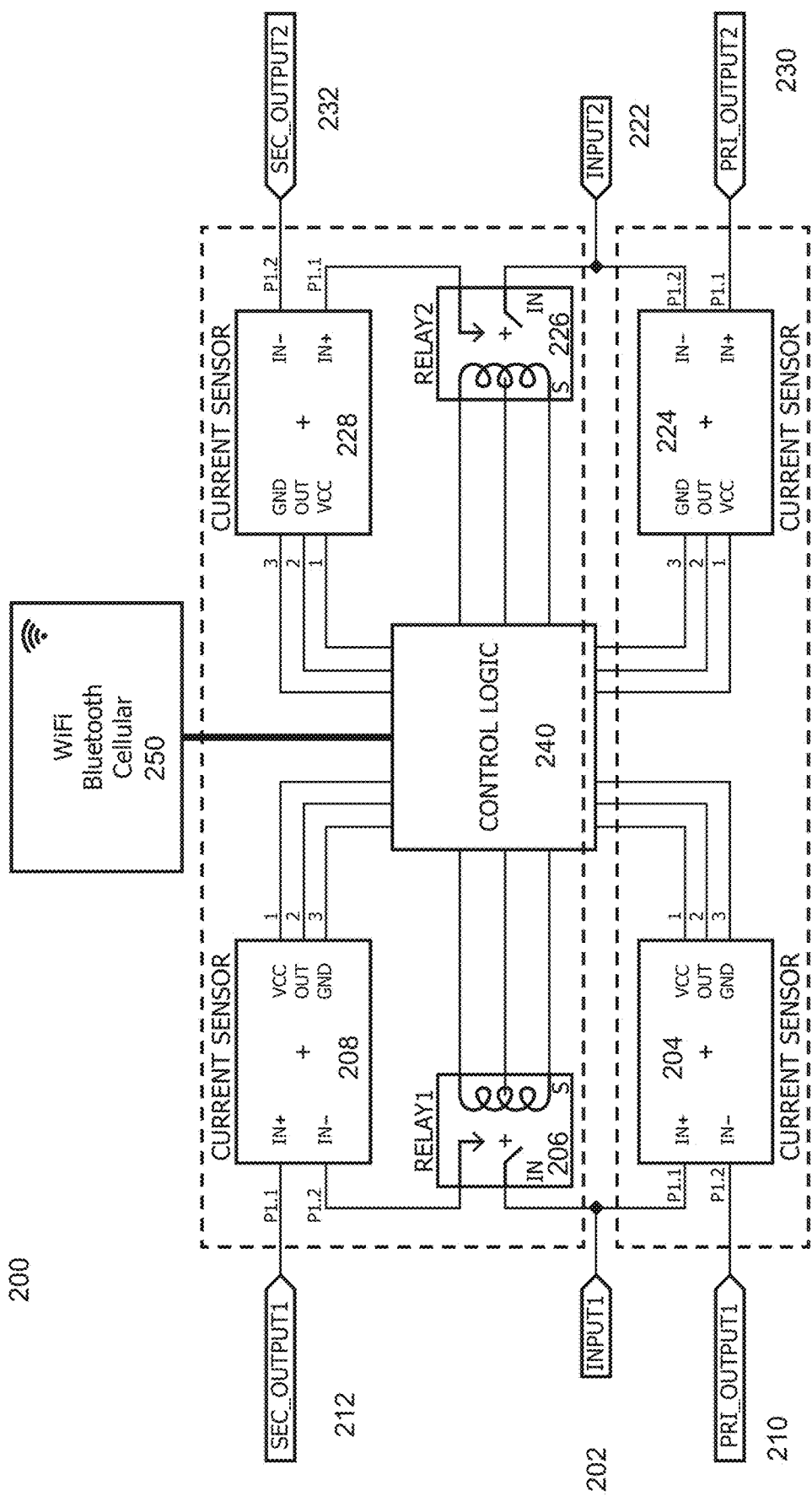
FIG. 2 is a diagram illustrating circuit components of a smart power splitter in accordance with certain embodiments of the invention.

The smart power splitter includes a first input and a second input connected to a first line and a second line of a power source. The power source may be, for example, directly from the service panel of a residence or from a wall AC (alternating current) power outlet. A schematic conceptually showing components of a smart power splitter with switchable secondary output in accordance with several embodiments of the invention is illustrated in FIG. 2.

On the smart power splitter 200, a first input 202 is connected to a first primary current sensor 204 and through a first relay 206 to a first secondary current sensor 208. The first input may typically be a conductor connected to a first prong of a wall plug that carries one of the hot phases in a wiring system such as split single phase or three-phase wiring. In other embodiments, the first input may be connected directly or by other mechanism to an electrical panel, for example in a house. A first primary output 210 follows from the first primary current sensor 204 and a first secondary output 212 follows from the first secondary current sensor 208. The first primary output 210 and first secondary output 212 may typically be connected to first prong receptacles of a primary outlet socket and a secondary outlet socket on the power splitter, respectively, intended for a first hot phase of wiring.

The second input 222 is connected to a second primary current sensor 224 and through a second relay 226 to a second secondary current sensor 228. The second input may typically be a conductor connected to a second prong of a wall plug that carries another of the hot phases in a wiring system such as split single phase or three-phase. In other embodiments, the second input may be connected directly or by other mechanism to an electrical panel, for example in a house. A second primary output 230 follows from the second primary current sensor 224 and a second secondary output 232 follows from the second secondary current sensor 228. The second primary output 230 and second secondary output 232 may typically be connected to second prong receptacles of a primary outlet socket and a secondary outlet socket on the power splitter, respectively, intended for a second hot phase of wiring.

A control logic 240 is connected to the first primary 204, first secondary 208, second primary 224, and second secondary 228 current sensors and the first 206 and second 226 relays. In several embodiments of the invention, the control logic 240 is also connected to one or more network interfaces 250 (e.g., Wi-Fi, Bluetooth, Cellular, etc.). Control logic 240 and network interface(s) 250 may also be combined onto one chip.

In many embodiments of the invention, one or more of the current sensors are current transformers, which can be, for example, Hall effect sensors used with a calibrated conductor. A certain amount of current passing through the sensor creates a voltage that can be read. Although a variety of sensors may be used, Hall effect sensors may be suitable for their size and heat considerations within an enclosed space. UL (Underwriters Labs) certification or other safety regulations may specify that certain devices classified, for example, as industrial inline controls cannot have ventilation holes. Therefore, the management of heat within the package, via component choices and power regulation, can be important. Other types of sensors that may be used can include current clamp or transducer, where a transformer ratiometrically outputs voltage for current sensing.

In many embodiments of the invention, one or more of the relays are latching mechanical relays that maintain their state through power cycles (e.g., if there is a power fault or failure). Several embodiments utilize relays with 8 mOhm resistance. Lower resistance can be desirable to lessen the amount of heat generated. Other types of relays can include solid state relays, which may create additional heat.

Figure 3:
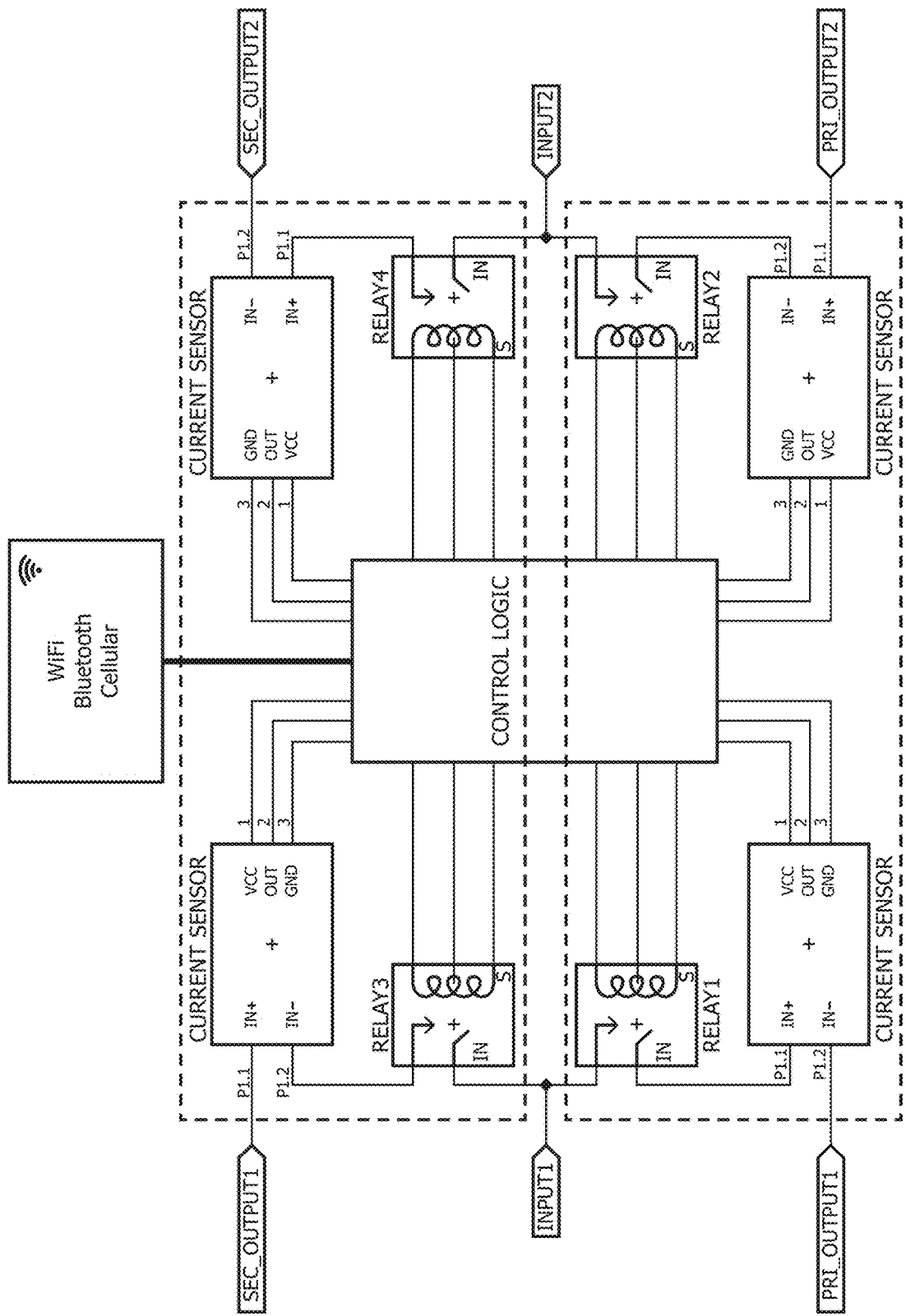
FIG. 3 is a diagram illustrating circuit components of a smart power splitter in accordance with certain embodiments of the invention.
Figure 4:
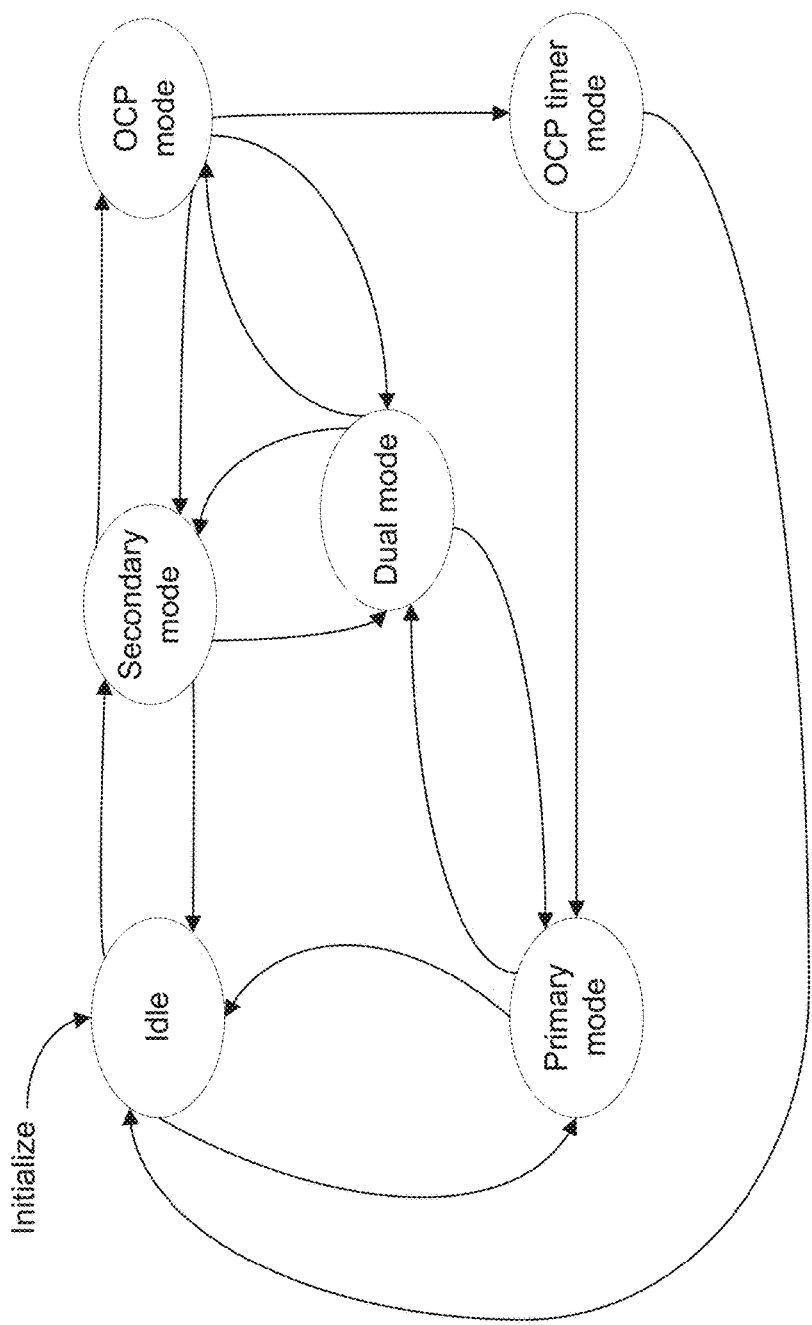
FIG. 4 is a state diagram illustrating how control logic states and transitions may be implemented in firmware of a smart power splitter in accordance with certain embodiments of the invention.

Additional embodiments of the invention include a power splitter where both the primary output and the secondary output are switchable via separate relays. One such embodiment is illustrated in FIG. 3. The layout may be similar to that described in FIG. 2 with the modification that a third relay is between the first input and first primary output and a fourth relay is between the second input and the second primary output. In such embodiments, the designation of which output is primary and which is secondary may be reconfigurable, such as manually by using a control application or by recognition of the type of device connected to each output (e.g., using load profiles as described below). For example, if a space heater and a dryer are connected to different outputs, the priority may be given to the space heater to remain enabled while the dryer is disabled in an overcurrent condition.

Many conventional power splitters utilize conventional wiring between components. While electrical components discussed above may be connected by plain wiring, several embodiments place components for power distribution on a printed circuit board (PCB). This can reduce resistance (and therefore heat) as well as be more efficient in manufacturing. In some embodiments, a PCB is utilized for construction with four layers of 2 oz copper, although different numbers of layers and different thicknesses may be utilized in various embodiments of the invention. Connectors (e.g., to sockets for the outputs) may be placed on the PCB using pins and a clamp screwed down to hold the connection. An alternative could be screw terminals to connect to input pins, but this would involve an external cord protruding from the enclosure (e.g., a one foot cable), which could violate electrical code regulations limiting the length of electrical cables to 25 feet. Many EV chargers already have a 25-foot cable. Furthermore, quality control processes can be performed to include testing resistance on each pathway to maintain a low temperature profile. Voltage can be applied to individual paths and the variance of resistance across different paths kept low to minimize generated heat.

The first outlet 1 and second outlet 3 in some embodiments of the invention can be GFCI (ground-fault circuit interrupter) protected. Ground fault detection may be incorporated into the control logic 240 or a separate component may provide GFCI protection. Control logic 240 can monitor the output lines 230 and 232 for imbalances between the two hot phases of an output or spikes in voltage that may register as ground faults and cut power to the outputs using relays 206 and 226. Another way of detecting ground fault can include placing a current transformer between an output and the return line of the input.

Further embodiments of the invention contemplate three or more power outputs from the power splitter. In these embodiments, one of the outputs may be designated the primary output by a manual setting or by detection similar to a two-output scenario as discussed below. Current measurement may also take the total current of all three or more outputs.

Although specific configurations of components and circuitry for smart power splitters are discussed above with respect to FIGS. 2 and 3, one skilled in the art will recognize that any of a variety of configurations may be utilized in accordance with embodiments of the invention as may be appropriate for a particular application. Operations that may be controlled by control logic in accordance with many embodiments of the invention are discussed below.

Control Logic

As mentioned above, a power splitter in several embodiments of the invention includes control logic that can control whether power is provided to either or both of the connected outputs. Control logic may be implemented in any of a variety of types of electronic circuitry, such as, but not limited to a microprocessor or microcontroller. Such circuitry may be programmable, such as by using an application or commands received from the network interface.

The control logic may control the power to the outputs in a number of ways, several of which will be discussed below.

Load Profiles and Appliance Identification

In some embodiments of the invention, the type of appliance or other electrical device connected to one or more of the outputs is set manually. In other embodiments, the type of appliance or other electrical device can be detected, for example, by the control logic or other circuitry. The pattern of characteristics concerning the amount of power that the appliance or electrical device is drawing at an output of the power splitter over time can be stored as a load profile. The power can be measured, for example, by the current sensors.

There is an advantage to having current sensors on each current-carrying connection of each output rather than just one, because more information is collected. Total power consumed by a device can be measured over time, rather than just switching based on threshold of an instantaneous measurement. It can also aid in detection of devices. For example, an electric dryer typically utilizes 240V for the heating element and 120V for the spindle motor, which then only uses one of the hot phases. To determine which connection the spindle motor is using, the power drawn can be detected as an imbalance (~3-5 Amps) between the two connections.

Identification of the appliance or other electrical device can be useful in configuring the control logic as will be described further below. Some devices cannot be gracefully restarted when power is stopped because they require some manual action to resume operation. For example, an electric dryer typically needs to have its start button pressed to start or resume a drying cycle. It may be desirable to accommodate these types of manual restart devices by, for example, not shutting off power to them in an over-current scenario or adjusting switching or power tracking parameters.

Recognition of a particular appliance can be used to determine a session-end timeout that controls how long the control logic waits after shutting off power to that output until it is reenabled. The session-end timeout can be different for different devices/appliances and stored within a device profile associated with each particular type of device.

For example, a default can be 60 seconds for appliances such as electric water heaters and electric dryers. EV chargers can be instantaneous. The timeout for induction ranges can be longer, e.g., 2-3 minutes. The power consumption profile of an induction range can appear to be a long stretched out PWM (pulse width modulation) signal, where it pulls 0 Amps for relatively long periods of time even though it is still in use. For example, if the stove is using a single burner on the low/simmer setting, the off period could last as long as 2-5 minutes. The session-end timeout should be longer to accommodate.

Other settings in a device profile can include logic concerning whether power can be shut off from a device based on timing. For example, when a dryer is early in a run cycle (e.g., 10 or 20 minutes) it may be preferably shut off, while if it is late in the run cycle (e.g., 40 minutes) it may not be shut off and priority given to the other output. Some smart devices that can provide information about their status, such as a wireless-enabled dryer, can communicate (e.g., to control logic a control application, a back-end server, or a cloud service) when it started or became active or how far along a cycle it is.

Control Logic States and Processes

Over time, the collected data can be stored and analyzed to identify trends, which can then be used to assist in decision making concerning allocation of power over the day and the week. Such information can be helpful to alert users in advance when power may not be available (such as to charge an EV). Based on historical data, the device may predict that an electric dryer will be used during the same time that an EV requests charging, and suggest an alternative time to charge or change an estimate for when charging will be completed based on the predicted allocation to the EV.

The splitter can monitor power being used by each device plugged into an outlet of the splitter, and disable the secondary device (typically, the EV) to prevent overloading the circuit when the primary device begins drawing power. Additionally, if the circuit is overloaded and the breaker doesn't trip, it can be a potential fire hazard, so the splitter prevents mistakes like these.

The switching point may be configurable in the control logic, for example using a control application as will be discussed below. It is typically 80% of the maximum current draw (as appropriate for a particular breaker size), but this may not be applicable when the connected appliances have different amperages.

According to the NEC (National Electric Code), only 30 A devices can be connected to 30 A breakers and only 50 A devices can be connected to 50 A breakers. This is because breaker sizes correlate with the maximum power the appliance connected to the circuit to avoid the chance of a short in the appliance not causing the breaker to trip.

In some customer use cases, they have non-standard 50 A breakers installed, but have a 30 A appliance such as an electric dryer connected to it. In this case, if a smart power splitter was installed to share the circuit with a 50 A EVSE, the dryer portion of the circuit would still be unsafe and pose risk of shorts without tripping the breaker. With an adjustable switching point, the primary outlet can be enabled to operate at a full 50 A capacity while limiting the secondary outlet to a more appropriate 30 A Maximum Overcurrent Threshold (as part of the software-controlled breaker system).

In this manner, the priority of each device connected to the splitter can be analyzed and power can be dynamically allocated to each outlet based on the power needs of each connected device, the total power drawn, and the priority of the devices. If the total power drawn or that will be drawn exceeds a maximum power rating of the outlet, power to a device can be disabled. For example, the device could utilize two thresholds when allocating power: T_MAX=100% of the rating of the circuit, and T_CONT=80% of the rating of the circuit, maximum continuous current. In another example, the device can utilize a max continuous current threshold that is 80% or some other predetermined percentage of the outlet current. In such example, a timer can be adjusted to trigger over current protection (OCP) if the threshold is exceeded. The specific adjustment to the timer may vary depending on how great the threshold is exceeded. In this manner, the device can reduce the likelihood of triggering OCP due to sensor noise or non-continuous use of power such as idle current by EVSE's. While the thresholds are described above as 80% and 100%, one skilled in the art will recognize that different thresholds may be utilized in accordance with embodiments of the invention as appropriate to a particular application. For example, thresholds of 85% and 110% may be more appropriate in some embodiments to allow for some noise and provide a less interrupted experience. The thresholds may be determined by testing and averaging samples with particular pieces of equipment to simulate normal usage in households.

Operation of the control logic can be described conceptually in terms of states and conditions to transition between states. Practically, in many embodiments of the invention this can mean implementing the operations in firmware or otherwise programming a microcontroller, microprocessor, or other electronic circuitry to enact states and transitions as will be described below. Furthermore, the below description serves as to provide examples and one skilled in the art will recognize that some subset of states may be imposed without others of the described states, and additional states may be present.

In some embodiments, firmware or other hardware or software programming can cause the control logic to impose states that govern whether the primary and/or secondary outputs are enabled (i.e., provided with power from the input) based upon the current draw of one or both of the outputs. The current draw may be determined, for example, using information from the current sensors as described further above, or obtained from vehicle telematics or EV smart charger integrations. In many embodiments of the invention, the states can include at least some of: idle, primary mode, secondary mode, dual mode, overcurrent protection mode, and overcurrent timer mode.

When the system is initialized, it can be started in Idle mode. In Idle mode, neither the primary output nor the secondary output is drawing power from the input. When the primary output (i.e., first primary output and second primary output) starts drawing power (current greater than zero, e.g., through a connected device/appliance), it can move to Primary mode. When the primary output stops drawing power, it can return to Idle mode. Similarly, when the secondary output (i.e., first secondary output and second secondary output) starts drawing power, it can move to Secondary mode. When the secondary output stops drawing power, it can return to idle mode.

Dual mode can be entered from Primary mode or Secondary mode. From Primary mode, it can move to Dual mode when the Secondary output starts drawing power and the total current draw of primary and secondary outputs is below a shutoff threshold. If the total is greater than the shutoff threshold, it moves back to Primary mode and the secondary output is shut off from power until the expiration of a session-end timeout, which indicates that the primary output's session is ended (e.g., the total current draw is less than a T_MIN for duration of the timeout). T_MIN is the minimum threshold to start a session, i.e., recognizing that the connected device is active or running A current less than T_MIN can be considered idle current or power draw at an idle state.

From Secondary mode, it can move to Dual mode when the primary output starts drawing power. It can move back to Secondary mode when the primary output stops drawing power.

Overcurrent Protection (OCP) mode can be entered from Secondary mode when the secondary output alone is drawing power greater than an overcurrent threshold or from Dual mode when the total of all outputs is greater than the overcurrent threshold. OCP mode can be considered a "soft breaker" that emulates a physical circuit breaker through software or firmware. At different levels of current exceeding the overcurrent threshold, different timers can be applied before reenabling the secondary output. At higher levels the timer can be longer. In further embodiments where the primary output has breakers, OCP mode can be entered from and returned to Primary mode as well.

For example, it is contemplated that the second outlet can be disabled if the current drawn by the first outlet is greater than 80% of an allowable current threshold or if the sum of the current collectively drawn by the first and second outlets is greater than 80% of the allowable current threshold.

If the primary device is using less current than the threshold T_CONT, the secondary outlet is enabled by the relays. As soon as a secondary device is connected and starts drawing power, the system or splitter monitors the total current to make sure it is below T_CONT. The system or splitter can have an over-current timeout so current spikes between T_CONT and T_MAX are allowed. In many embodiments of the invention, the over-current timeout can vary based upon additional threshold levels. Higher threshold levels can have shorter timeouts. For example, if the total power draw is sustained above T_CONT for five seconds or other predetermined threshold, the system or splitter can disable the secondary outlet. If at any time the splitter draws more than T_MAX current, the system or splitter can disable the secondary outlet for safety reasons.

Figure 5:
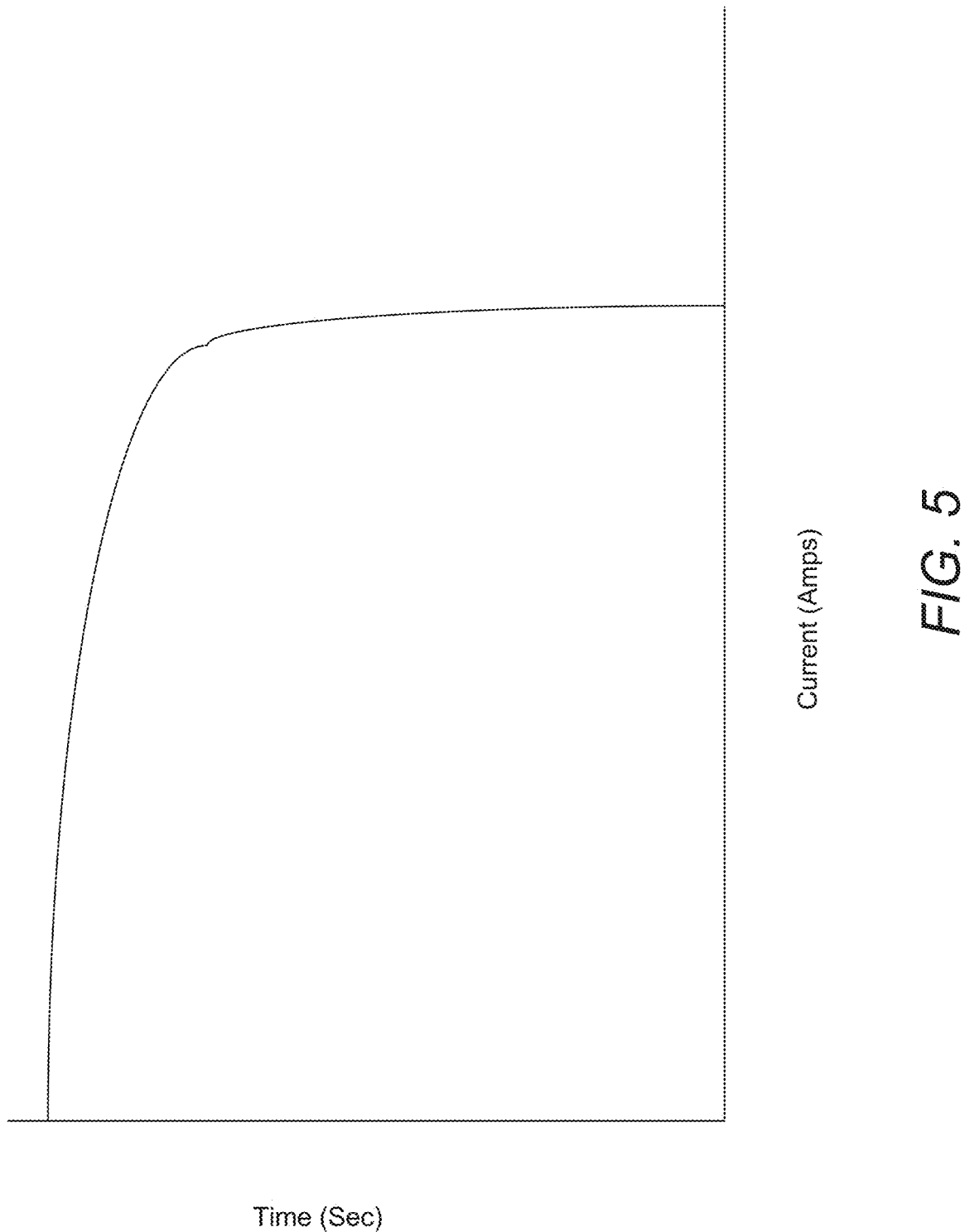
FIG. 5 is a graph illustrating an example overcurrent timeout curve in accordance with certain embodiments of the invention.
Figure 6:
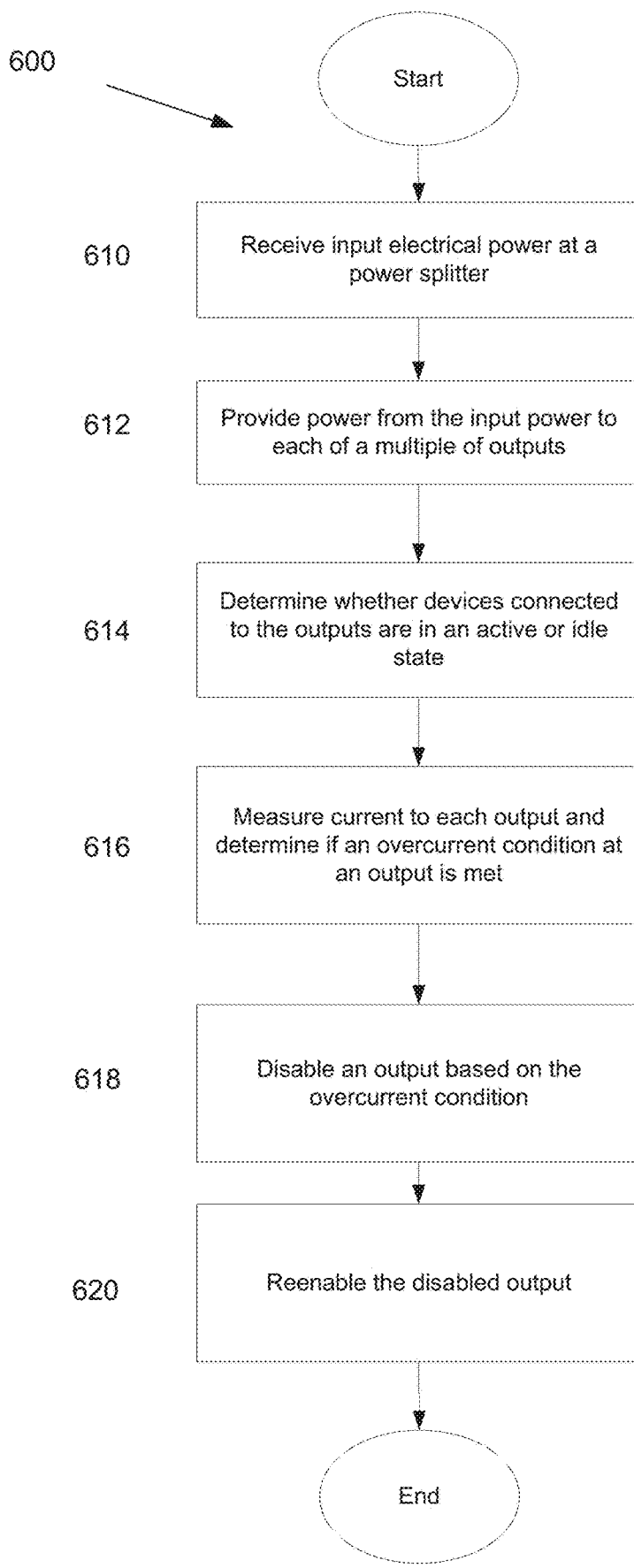
FIG. 6 is a flow chart illustrating a process for sharing power between outputs using a power splitter in accordance with certain embodiments of the invention.

An example of a variable threshold curve in accordance with certain embodiments of the invention is illustrated in FIG. 5. On the pictured graph, the vertical axis represents length of timeout and the horizontal axis represents amount of overcurrent (exceeding a threshold such as T_CONT). The illustrated curve appears as an inverse log function such that moving higher in current exponentially decreases the timeout. The timeout decreasing with increasing detected current can alternatively be represented as a table with current values and associated timeout values. The measured current can be calculated, for example, as a windowed average (or moving average) with data smoothing to avoid spikes. In some embodiments, the current can be sampled at a rate of 20 Hz for example. The idea is that the current is sustained within range of a certain level for some time to register at that level.

If the secondary outlet was disabled due to overcurrent by the secondary device, an over-current protection counter (OCP counter) can be incremented and the outlet will be disabled for ten minutes or other predetermined period. This gives certain EVSEs a chance to automatically adjust to the next lower charging current setting. If the OCP counter is triggered more than five times, the outlet can be disabled for a longer period such as two hours. A OCP count notification may be provided through a user interface, such as on a control application as will be discussed further below. The OCP count notification may prompt a user to change charge rate settings to correct the issue and/or to override the disablement timeout.

If the secondary outlet was disabled due to the total current exceeding T_CONT or T_MAX, and the secondary device is not at fault (e.g., exceeding the threshold on its own), the splitter can wait for the primary device to finish using power, and then re-enable the secondary outlet. In many embodiments, when OCP mode is entered from Primary mode, it returns to Primary mode to wait for the primary device to finish.

Processes for Sharing Power Between Outlets

Figure 7:
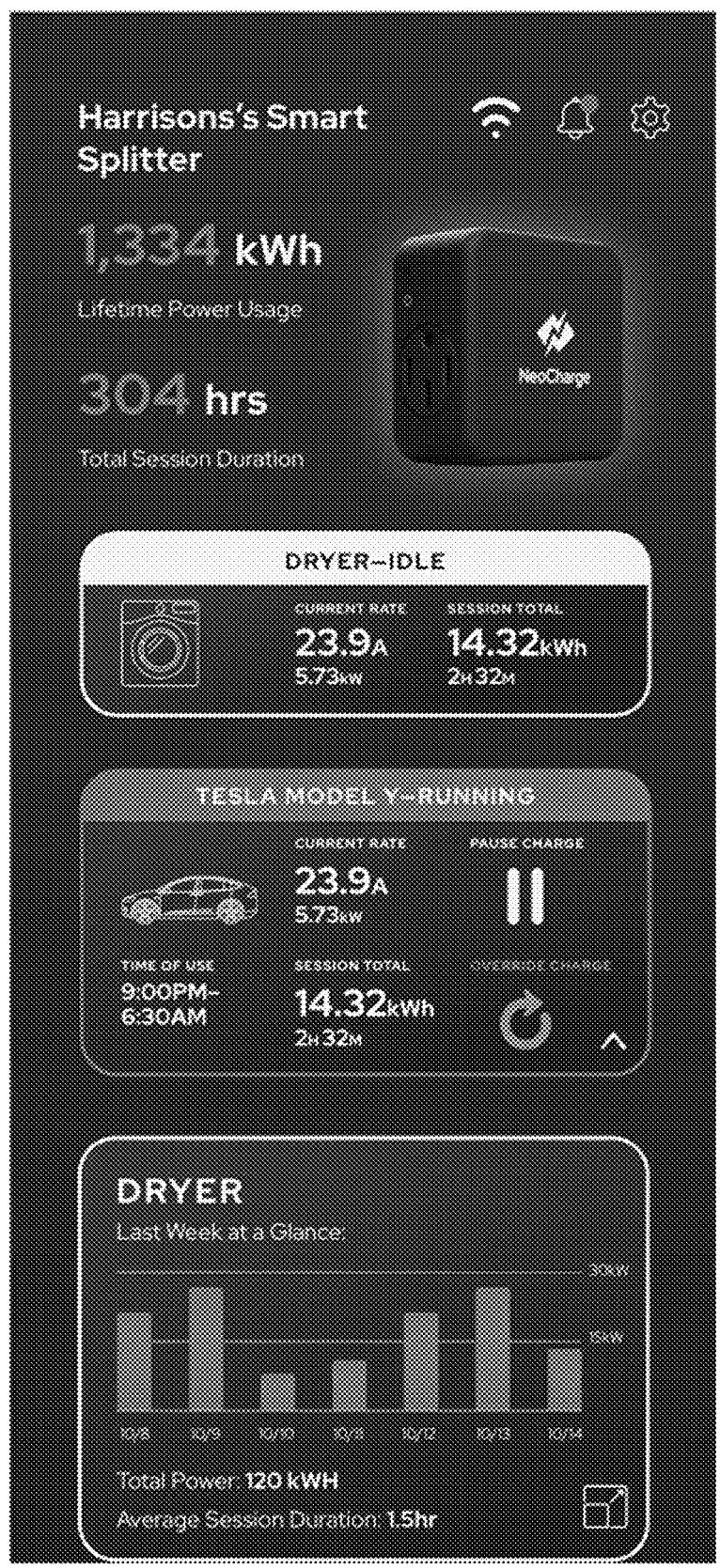
FIGS. 7-9 depict graphical user interface screens of a control application for a smart power splitter in accordance with certain embodiments of the invention.

Processes for sharing power between outlets using a smart power splitter such as those described above in accordance with embodiments of the invention are described. One such process is illustrated in FIG. 7. The process 600 includes receiving (610) input electrical power at a power splitter, where the input electrical power includes at least two hot phases and can include a neutral or ground phase. The input at the power splitter can include conductors for each corresponding phase.

The process includes providing (612) power from the input power to each of a multiple of outputs, where each output can have conductors to carry a corresponding hot phase. Depending on whether an output is enabled or disabled (e.g., due to overcurrent protection or ground fault), relay(s) may direct the output to receive power or not receive power.

The process includes determining (614) whether devices connected to the outputs are in an active or idle state. As discussed further above, the state of a device can affect timers and/or timeouts. The process can also include identification of the type of devices connected to the outputs as described further above.

The process includes measuring (616) current to each output and determining if an overcurrent condition is met based on current measurement and time. As discussed further above, if current is of one output or total of all outputs sustained at a certain level for a certain period of time, overcurrent protection may apply and disconnect power from one or more outputs.

The process includes disabling (618) an output based upon the overcurrent condition. In several embodiments, the secondary output is disabled from receiving power.

The process includes reenabling (620) the disabled output. As discussed further above, this can be based upon a timer and timeout and the measured current of one or more outputs being below a threshold, or other conditions in several embodiments of the invention.

While a specific process is described above with respect to FIG. 7, one skilled in the art will recognize that any of a variety of processes may be utilized in accordance with embodiments of the invention. Control applications that may used in connection with smart power splitters in accordance with embodiments of the invention are described below.

Control Application

In several embodiments of the invention, a companion control application running on a computing device, such as a mobile device, may be used in conjunction with the smart power splitter and write settings to the control logic, take on some functions from the control logic discussed above and/or add complementary functions. The control application may communicate with the smart power splitter using one of the network interfaces. In some embodiments, the control application may also communicate with a back-end server or cloud service to send and receive information. For example, the control application may receive information from a power splitter indicative of the waveform or power consumption characteristics of a connected device (e.g., appliance or EV charger) discussed further above as a load profile. This information can be used to classify or determine what type of device it is, and different settings/thresholds/timers (i.e., as associated with a device profile) can be applied based on the device profile. In some embodiments, the classification can be performed by the control application on a mobile device. In other embodiments, the power consumption characteristics can be packaged by the control application on a mobile device and sent to a back-end server or cloud service to perform the classification.

Figure 8:
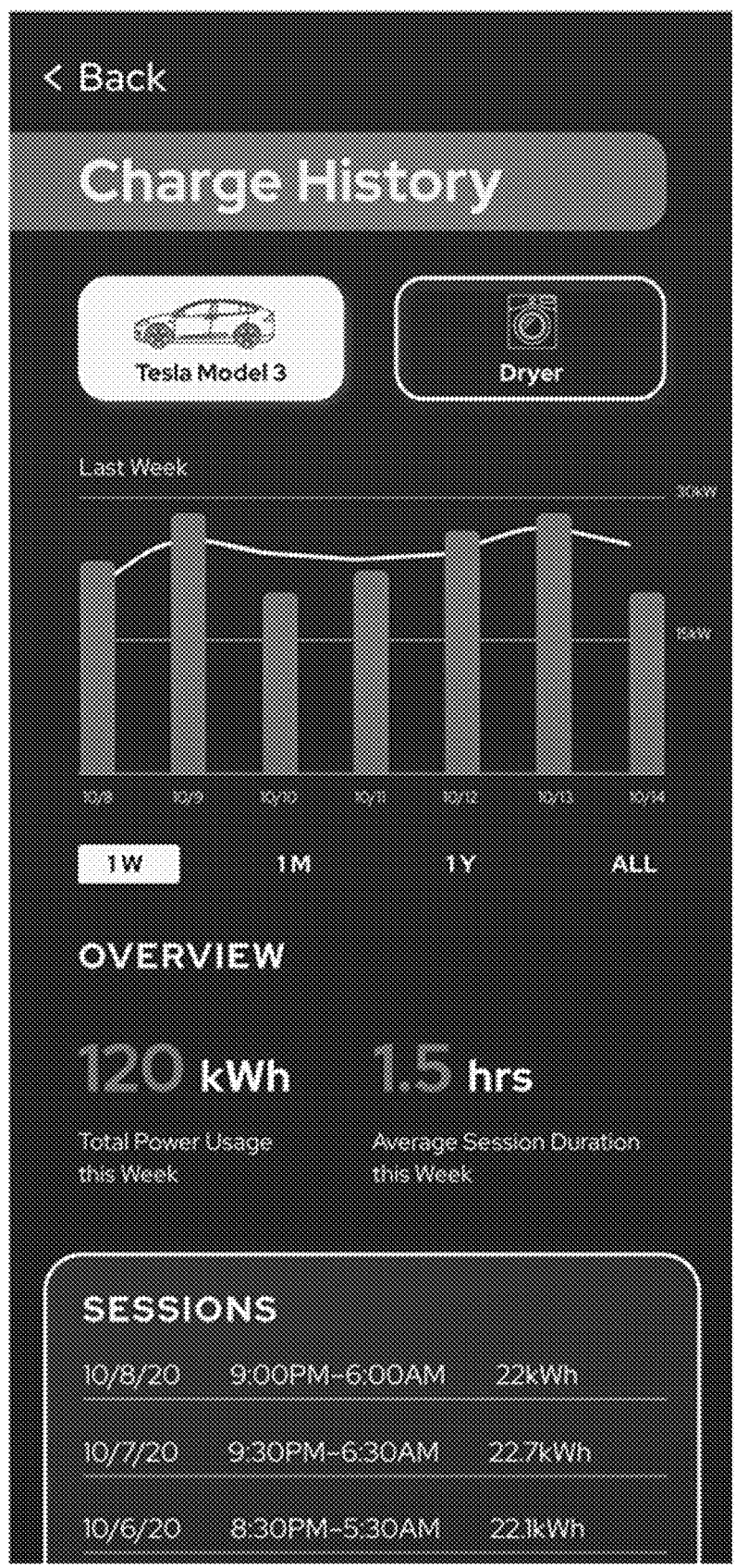
Figure 9:
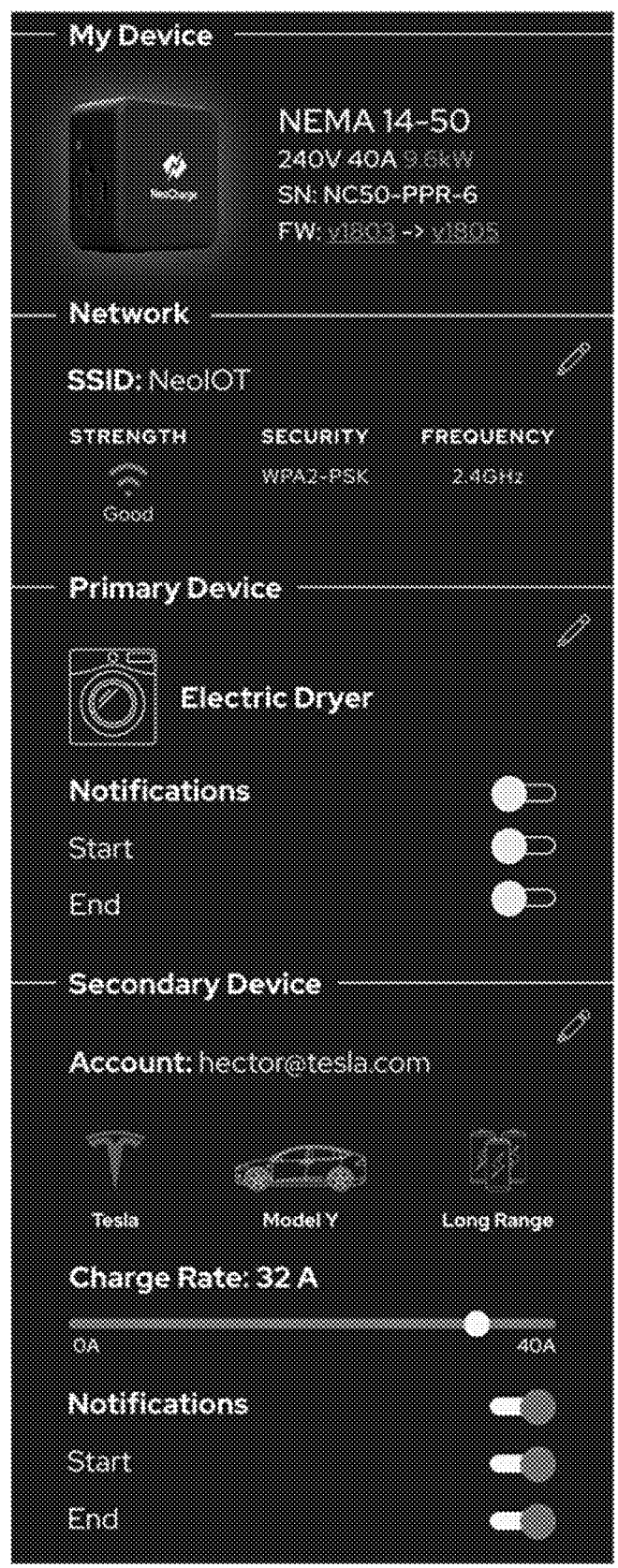

Additionally, in certain embodiments the control application may capture settings input to a graphical user interface and send the settings to be implemented on the power splitter (e.g., within the control logic). FIGS. 7-9 illustrate examples of graphical user interface screens that may be shown on a mobile device in accordance with several embodiments of the invention.

FIG. 7 shows a home screen that displays information such as instantaneous power usage, run-time of the connected appliances and/or EVSE, statistics of usage, connection status, notifications, and/or charging history summary.

FIG. 8 shows a charging history screen that displays usage history of the smart power splitter that can calculate total cost of charging over periods of time (e.g., 1 week, 1 month, 1 year). Clicking into charging sessions can display detailed views.

FIG. 9 shows a settings screen that can set what devices (e.g., type of appliance, EV charger, etc.) are connected to each output connection. The screen can also be used for account linking of third-party integrations, e.g., utility company, OhmConnect, Tesla, etc.

In some embodiments, the control application may integrate with a calendar on the mobile device or coordinate its own calendar for scheduling charge times when outputs of the splitter are enabled.

In further embodiments, the application can display a fault condition and/or provide an alert if a device is drawing more power than usual.

Network Functionality

In some embodiments, the splitter can have a transceiver configured to transmit and/or receive data signals from remote devices. In such embodiments, the splitter can assist with demand response for utilities, enabling utilities to better manage the grid. It is contemplated that the splitter can communicate with a remote software application such as loaded on a consumer's smart phone or other computing device to access information about the splitter, its power management and other information. For example, the customer may choose what type of power is received from the grid such as renewable or non-renewable energy. This can reduce the carbon footprint of charging an electric vehicle by reducing the need to fire up marginal coal-fired power plants to meet the energy demand of the grid.

The transceiver could permit wired or wireless communication. Some contemplated wireless communication standards include Wi-Fi, Bluetooth, Bluetooth Low Energy, ZigBee, and any other commercially suitable standard or protocol.

By permitting communication with other devices, it is contemplated that the splitter could communicate with third party smart chargers or cards with connectivity, such as to reduce a number of power disruptions and to allow for seamless transition between charging multiple EVs. For example, software-controlled power sharing between two EVs charging at the same time may provide 20 Amps to each, until one EV is complete and its charging stopped. Then the remaining charger may receive 40 Amps. These limits can be set by, for example, by the power splitter determining which devices are active and communicating to the EV chargers whether they may draw more power. Similarly, the power splitter may communicate with appliances to allow for better timing with grid events (DR, Peaks, Carbon, etc.). In addition, the communication can permit usage and metering data to be provided to utilities and other entities, assisting customers will selecting rate plans and/or times of day to charge to save money.

The splitter could receive information concerning peak power demands from a utility, and account for that information when allocating power. In this manner, emission reduction could occur by postponing non-essential usage of power from the outlet and thereby reducing the power load when electricity usage peaks.

In some embodiments, information from multiple splitters disposed at different locations in a geographic area can be gathered and analyzed. Data from the splitters can be used by utility providers to classify clusters of devices that share common upstream infrastructure such as step down transformers. Overloading this infrastructure by drawing too much power is a very expensive and unnecessary cost for utilities, and it will likely become more of an issue as more people purchase EVs and the demand on the grid increases.

The amount of power drawn through the neighborhood level step-down transformer can be dynamically adjusted by reducing the number of EVs and 220V devices drawing power at the same time. This is possible by disabling the charging of some EVs based on priority determined by the user's requirements and the average charging time of each EV. Once these device sets are identified, the data can be provided from the utilities or gathered from monitoring devices connected to transformers to reduce the charging load in times of high power usage. Data sources such as weather providers can also be used to predict days of high energy usage in order to further optimize our charging.

Further, using telematics built into the vehicle, the control logic can see the state of charge of a connected EV and use that as additional data for the dynamic load balancing algorithm. The control logic may also instruct the EV or EV charger to throttle the amount of power it is drawing to maintain a lower total draw through the splitter to avoid shutoff. Similarly, if two EVs or EV chargers are connected to the power splitter, the control logic may balance the power drawn by each.

It is also contemplated that third-party providers such as WattTime™ can be utilized to integrate power generation data in the analysis by the splitter or system and identify the carbon footprint of using a unit of power at any given time and location. The amount of carbon generated by using power from the grid can fluctuate throughout the day based on the mix of renewable and non-renewable energy available on the grid. If there are demand peaks above the available clean power on the grid, coal or natural gas-powered plants, also called marginal plants, are turned on to meet the peak. The carbon emissions produced by these marginal plants are known as marginal emissions, and by shifting some of the load to non-peak times, you can effectively cut down the carbon footprint of charging.

It is further contemplated that payment processing can be integrated into a software application that works with the splitter, which could be used to permit charging at different locations not associated with the user (such as other people's homes or offices). Thus, for example, using the software application, a homeowner could permit and charge others to utilize the homeowner's outlet such as to charge an EV. It is contemplated that rates could be set by the homeowner as well as permitted times, or other criteria.

In other embodiments, it is contemplated that the device can be installed into a junction box to tap into an existing 220V connection by a licensed electrician. This device can include the same base switching functionality as described above to prevent circuit overloads. In further embodiments, integrating an EVSE into the device, communicating vehicle telematics from a separate EVSE to the power splitter (control logic), or obtaining information through a networked (smart) charger integration can permit adjustment of the charging rate to meet the current limit while an appliance is also in use.

Eventually, when EVs have far more range than can be used in a single day, EVs will not need to be charged to full every night. We can integrate the information from the dynamic transformer load reduction system as well as the grid data provider in conjunction with info such as the vehicle's state of charge and the user's driving habits to optimize charging. We can use this data to predict how much range the user will need to get through the next day, and charge at the most optimal times to reduce the carbon footprint of EV charging. In addition, by not charging the batteries to 100% every night, we can prolong the lifetime of the battery as well as reduce the stress on grid infrastructure. Further, our device can integrate with energy management systems, solar generation systems battery storage and other microgrid infrastructure to charge the EV when the most optimal forms of energy are available.

The splitter can also facilitate vehicle to grid protocols to be able to feed power back into the local grid. This allows the EV to act as battery storage by charging when power generated by solar systems is available and discharging to power the house or charge other electric vehicles. Energy management network for appliances and EV charging plugs that optimizes for grid performance.

As one skilled in the art will recognize, any or all of the above capabilities may be implemented in the control logic and/or the control application when they are equipped with a network interface that can communicate with these services and/or retrieve information, such as, but not limited to, a Wi-Fi card, ethernet interface, Bluetooth, or cellular data connection.

CONCLUSION

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

The use of terms referencing servers, services, interfaces, portals, platforms, or other systems formed from computing devices is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A power distribution system for managing power distribution from in-home electrical wiring, the system comprising:
a power splitter device comprising:
an electrical input source connection with a first input line and a second input line for two hot phases of alternating current electricity;
a primary electrical output and a secondary electrical output, the primary electrical output having a first primary output line and a second primary output line, and the secondary electrical output having a first secondary output line and a second secondary output line;
a set of current sensors comprising:
a first current sensor connected to the first primary output; and
a second current sensor connected to the second primary output;
a first relay connected between the first input line and the first secondary output;
a second relay connected between the second input line and the second secondary output; and
a control logic microprocessor configured to:
receive measurements of current from the set of current sensors;
determine a shutoff condition based upon a plurality of measurements of current over a period of time from the set of current sensors; and
disconnect power from the secondary electrical output connection by switching the first relay and the second relay based upon a determined shutoff condition.

2. The power distribution system of claim 1, wherein determining the shutoff condition comprises determining that the total current drawn by the primary and the secondary electrical outputs measured by the first, second, third, and fourth current sensors is greater than a predetermined threshold for a specified period of time.

3. The power distribution system of claim 2, wherein the predetermined threshold and specified period of time are variable, each value of threshold has an associated period of time, greater values of threshold have a shorter period of time.

4. The power distribution system of claim 1, wherein the first outlet is operationally connected continuously to the input source connection.

5. The power distribution system of claim 1, wherein the input source connection is configured to receive a high voltage power, and wherein the high voltage comprises an alternating voltage with an average value of between 187 and 270 volts and a frequency between 46 and 69 hertz.

6. The power distribution system of claim 1, wherein the current sensors are of a type selected from the group consisting of: hall effect sensor, shunt resistor, and current transformer.

7. The power distribution system of claim 1, wherein the first and second relays are latching relays.

8. The power distribution system of claim 1, wherein the second outlet is disabled if a current drawn by the first outlet is greater than 80% of an allowable current threshold or if a sum of the current drawn by the first outlet and a current drawn by the second outlet is greater than 80% of the allowable current threshold.

9. The power distribution system of claim 1, further comprising:
a printed circuit board, and
wherein the current sensors, relays, and control logic microprocessor are connected to the printed circuit board.

10. The power distribution system of claim 1, wherein the power splitter device further comprises a network interface and is configured to communicate with a mobile device using the network interface.

11. The power distribution system of claim 10, wherein the power splitter device is configured to:
collect current measurements from the current sensors as a load profile;
provide the load profile to the mobile device;
receive a device profile that identifies of a type of electrical device determined from the collected current measurements; and
set timeouts based upon the device profile.

12. The power distribution system of claim 10, wherein the power splitter device is configured to receive instructions from the mobile device to reconfigure the control logic to set criteria for a shutoff condition.

13. The power distribution system of claim 1, wherein the power splitter device further comprises a network interface and is configured to communicate with a remote service for third-party integrations.

14. The power distribution system of claim 1, wherein the set of current sensors further comprises:
    a third current sensor connected to the first secondary output; and
    a fourth current sensor connected to the second secondary output.

15. The power distribution system of claim 1, wherein the control logic microprocessor is further configured to: switch the first relay and the second relay to connect power to the secondary electrical output when a solar generation system is generating power and to disconnect power to the secondary electrical output when availability of the solar generation system falls below a threshold.

16. The power distribution system of claim 1, wherein the control logic microprocessor is further configured to:
    receive a state of charge of a connected electric vehicle (EV); and
    balance load between the primary electrical output and the secondary electrical output based upon the received state of charge.

17. The power distribution system of claim 1, wherein the control logic microprocessor is further configured to:
    detect grid outage based upon received external information; and
    communicate with connected appliances to reduce power draw upon a detected grid outage.

18. The power distribution system of claim 1, wherein the control logic microprocessor is further configured to:
    receive information concerning peak periods of electricity supply from a utility; and
    allocate power draw to the primary electrical output and the secondary electrical output based upon peak periods of electricity supply.

19. The power distribution system of claim 1, wherein the control logic microprocessor is further configured to prioritize power supply to the primary electrical output and the secondary electrical output based upon a user configuration.

20. The power distribution system of claim 1, wherein the control logic microprocessor is further configured to:
    receive carbon emissions data of power received by the power splitter device; and
    shift some load of power provided to the primary electrical output and the secondary electrical output to non-peak times based upon the received carbon emissions data.

* * * * *